United States Patent [19]

Montagne

[11] 3,949,799

[45] Apr. 13, 1976

[54] HIGH-SPEED RADIAL TIRE WITH FOLDED METAL BELT

[75] Inventor: Jean Bernard Montagne, Cebazat, France

[73] Assignee: Compagnie Generale des Establissements Michelin, Clermont-Ferrand, France

[22] Filed: Nov. 20, 1974

[21] Appl. No.: 525,676

Related U.S. Application Data

[63] Continuation-in-part of Ser. No. 313,643, Dec. 11, 1972, abandoned.

[30] Foreign Application Priority Data

Dec. 15, 1971  France .............................. 71.45193

[52] U.S. Cl. ............................................ 152/361 FP
[51] Int. Cl.² ............................................ B60C 9/18
[58] Field of Search ...... 152/361 FP, 354, 357, 359, 152/355

[56] References Cited
UNITED STATES PATENTS

| | | | |
|---|---|---|---|
| 3,243,338 | 3/1966 | Jackson ........................ | 152/361 FP |
| 3,357,470 | 12/1967 | Massoubre ..................... | 152/361 FP |
| 3,395,529 | 8/1968 | Ray ............................... | 152/361 FP |
| 3,404,721 | 10/1968 | Massoubre ..................... | 152/361 FP |
| 3,515,197 | 6/1970 | Boileau ......................... | 152/361 FP |
| 3,613,763 | 10/1971 | Fletcher ........................ | 152/361 FP |
| 3,623,529 | 11/1971 | Fausti ........................... | 152/361 FP |
| 3,672,423 | 6/1972 | Duduk .......................... | 152/361 FP |
| 3,831,656 | 8/1974 | Senger et al. ................. | 152/361 FP |

*Primary Examiner*—Drayton E. Hoffman
*Attorney, Agent, or Firm*—Brumbaugh, Graves, Donohue & Raymond

[57] ABSTRACT

The tread reinforcement of a high-speed radial tire comprises at least one folded ply of twisted metal cords. The direction of the fold of the ply, the direction of the inclination of the cords with respect to the circumferential direction of the tire, and the direction of the twist of the cords are such, relative to one another, that the cords are relatively untwisted at the fold. Thus, in the case where the ply is folded radially outward, the folded ply and the cords composing it are both type S or both type Z, while in the case where the ply is folded radially inward, the folded ply and the cords composing it are of opposite S/Z type.

8 Claims, 10 Drawing Figures

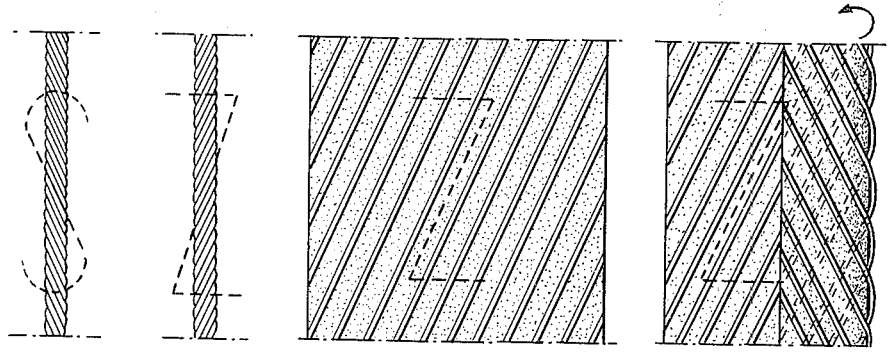
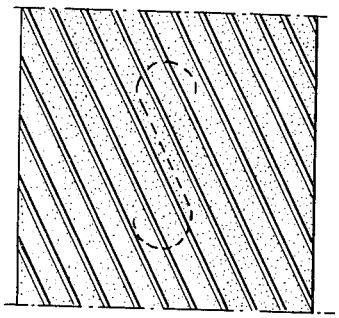
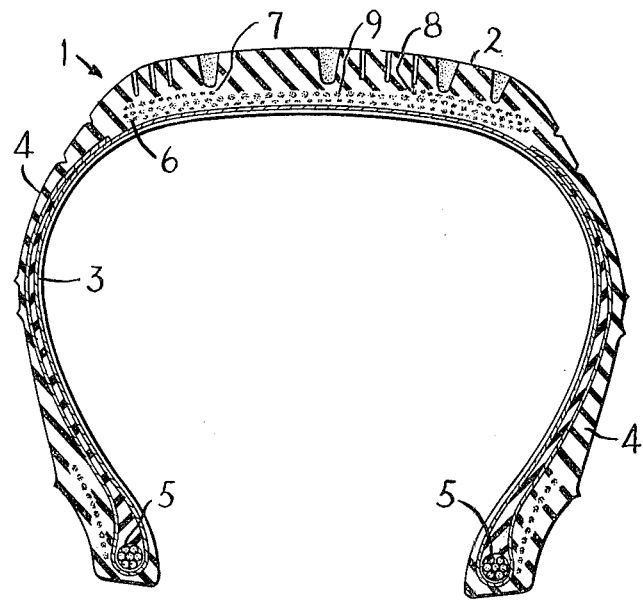
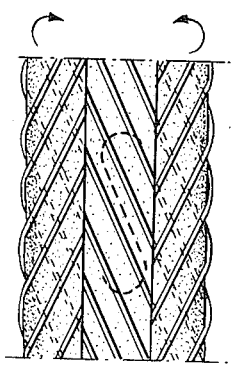
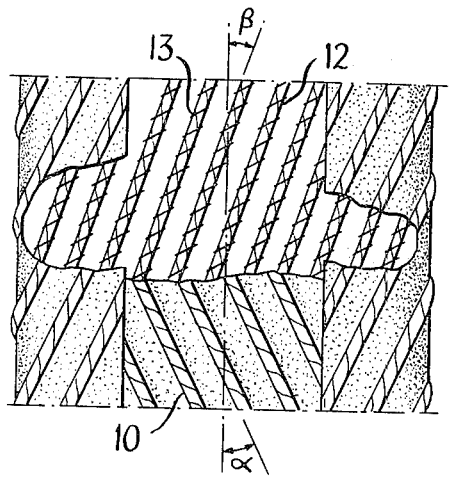

HIGH-SPEED RADIAL TIRE WITH FOLDED METAL BELT

CROSS REFERENCE TO RELATED APPLICATION

This is a continuation-in-part of my copending application Ser. No. 313,643, filed Dec. 11, 1972, for "High-Speed Radial Tire" and now abandoned.

BACKGROUND OF THE INVENTION

This invention relates to tires and, more particularly, to steel-belted radial-carcass tires designed for high-speed travel.

A radial-carcass tire comprises a carcass reinforcement formed of cords or cables arranged in radial planes of the tire and a rigid unstretchable tread reinforcement formed of a plurality of plies of cords. The cords are slightly inclined to the circumferential direction of the tire. The tread reinforcement surrounds the carcass reinforcement below the tread.

Travel at high speed on radial-type tires requires a special structure of the tread reinforcement. One solution which has proven itself in practice is described in French Pat. No. 1,427,886. In accordance therewith, the tread reinforcement is practically cylindrical and comprises at least one ply of metal cords or cables with folded edges and at least one unfolded ply of metal cords or cables. This solution results in particularly favorable road properties, including high speed capability.

SUMMARY OF THE INVENTION

An object of the invention is to make a further improvement in tires, especially in steel-belted radial tires designed for high speeds. Another object of the invention is to make this improvement without any increase in manufacturing costs.

The foregoing and other objects are attained in accordance with the invention by the provision of a tire comprising a radial carcass and a tread reinforcement, the tread reinforcement being formed with at least one folded ply of twisted metal cords and being characterized in that the direction of the fold of the ply, the direction of the inclination of the cords with respect to the circumferential direction of the tire, and the direction of the twist of the cords are such, relative to one another, that the cords are relatively untwisted at the fold. Thus, in the case where the ply is folded radially outward (i.e., the folded portion is radially outward of the base portion of the ply), the folded ply and the cords composing it are both type S or both type Z, while in the case where the ply is folded radially inward (i.e., the folded portion is radially inward of the base portion of the ply), the folded ply and the cords composing it are of opposite S/Z type. The invention provides the advantage that the tire in operation experiences fewer breaks in the folded cords.

A cable, cord or strand is said to be of S (or of Z) type when their elemental parts have, as seen by an observer, an inclination in the same direction as the central portion of the letter S (or Z). A cord or cable and the strands of which it is composed are generally of the same type, that is to say, either S or Z.

A ply is said to be an S (or a Z) ply when the cords have, as viewed by an observer from a position radially beyond the tire tread, an inclination in the same direction as the central portion of the letter S (or Z). In the case of a folded ply, one considers the direction of the cords or cables before the folding over of the edge or edges of the ply.

In a preferred embodiment of the invention, when the tread reinforcement comprises at least one folded ply and one unfolded ply, the cords of which make different angles with the circumferential direction of the tire, the larger angle is assigned to the cords of the folded ply or plies.

Preferably the angle made by the cords of the folded ply or plies with the circumferential direction is greater than 15°, and even greater than 22½°, without, however, exceeding 35°. The larger this angle, the fewer breaks of cords in the vicinity of the fold are noted. In practice, it happens that the metal cords or cables used in the manufacture of tires are of S type. It also happens that the custom prior to the present invention was to use a Z ply as the tread ply nearest the carcass and to fold the ply radially outward. In accordance with the invention, the direction of inclination of the cords is reversed, or the direction of the fold is reversed, and the number of breaks of cords, under conditions which are otherwise strictly identical, decreases substantially: under conditions of travel in which sixty breaks of cords appeared in a conventional tire, only a few breaks — three to five, and sometimes none at all — are found in the tire of the invention.

When a Z ply is produced with an S cord or cable, there takes place, upon the folding of the ply in a radially outward direction, an overtwisting of the cord or cable in the region of the fold, which decreases its breaking force and its elasticity. If, on the other hand, an S ply is produced with an S cord or cable, then upon the folding of the ply in a radially outward direction there is produced an untwisting of the cord or cable in the vicinity of the fold, which increases its breaking force and its elasticity. Similarly, when an S ply is produced with an S cable, there takes place, upon the folding of the ply in a radially inward direction, an overtwisting of the cable in the region of the fold, which decreases its breaking force and its elasticity. If, on the other hand, a Z ply is produced with an S cable, then upon the folding of the ply in a radially inward direction there is produced an untwisting of the cable in the vicinity of the fold, which increases its breaking force and its elasticity. The overtwisting or untwisting is not negligible and can correspond to about 30 to 60 turns per meter, this overtwisting or untwisting applying, of course, only to a short length of cord or cable of the order of 1 to 2 cm forming the folding zone. By way of comparison, an elastic cord or cable having a pitch of 6 mm has about 166 twists per meter.

The use of relatively large cord angles for the folded plies has the advantage of reducing the number of breaks of cords under severe conditions of travel, and therefore of reducing the rate of fatigue in the region of the fold under less severe normal conditions of travel.

BRIEF DESCRIPTION OF THE DRAWING

An understanding of other aspects of the invention can be gained from a consideration of the following detailed description of the preferred embodiments thereof, in conjunction with the appended figures of the drawing, wherein:

FIGS. 1S and 1Z show an S cord and a Z cord, respectively;

FIGS. 2S and 2Z show an S ply and a Z ply, respectively, before folding;

FIGS. 3S and 3Z, respectively, show the same plies after the folding of one or both edges in a radially outward direction over the unfolded portion;

FIG. 4 is a view in radial section of a tire in accordance with the invention;

FIG. 5 is a developed plan view of the tread reinforcement of the tire of FIG. 4.

DESCRIPTION OF THE PREFERRED EMBODIMENTS

Figure 6:
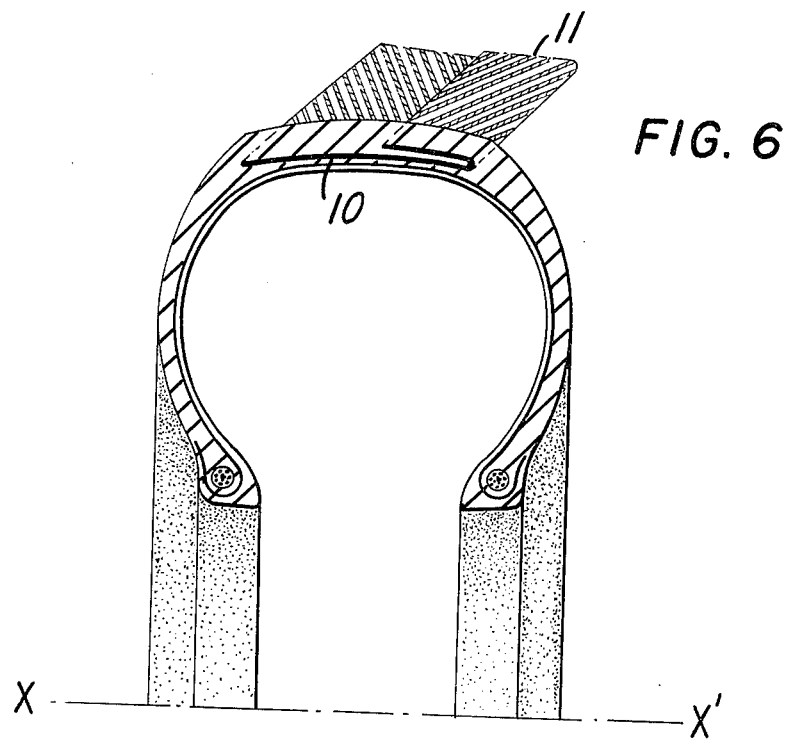
FIGS. 6 and 7 are fragmentary sectional perspective views, partly broken away, illustrating, respectively, the folding of a tread ply in the radially outward direction and the radially inward direction in accordance with the invention.

In all of the figures of the drawing, the diameters of the cords or cables as well as their distance apart have been exaggerated for clarity.

FIGS. 1S, 1Z; 2S, 2Z; and 3S, 3Z illustrate the definitions which have been given of the S or Z cables and plies. In FIG. 3S there is shown an S ply having its two edges folded radially outward, arrows indicating the folding movement effected.

In FIG. 4 there is shown a tire 1 in accordance with the invention. There can be noted the tread 2 and the carcass 3 formed of radial cords reinforcing the sidewalls 4 and anchored around the bead wires 5. Between the tread 2 and the carcass 3 there is arranged a tread reinforcement formed of an unfolded ply 9 and a ply 6 the edges of which are folded radially outward and terminate at points 7 and 8.

FIG. 5 shows the structure of the folded ply 6 in the tread reinforcement. The cords or cables 10 of the ply 6 are of the same type as the cable of FIG. 1S; they are therefore of S type. The ply 6 furthermore has the same configuration as in FIGS. 2S and 3S and is therefore of S type. Thus, in accordance with the invention, the cables 10 and the ply 6 are both of S type. It would, of course, be possible for the cords or cables 10 and the ply 6 to be both of Z type, which would require reversing the direction of inclination of the cables 12 of the ply 9. Similarly, it would, of course, be possible for the cords 10 and the ply 6 to be of opposite S/Z type, which would require reversing the direction of the fold of the ply 6. That is, the ply 6 would be folded radially inward rather than radially outward.

The characteristics of the cords or cables 10 of the ply 6 and of the cords or cables 12 of the ply 9 for one example of a tire of size 185 × 14 are as follows:

a. Folded ply 6

The cables 10 are composed of three strands assembled with a pitch of 6 mm in the S direction; each strand is formed of a central wire surrounded by six wires assembled with a pitch of 4 mm in the S direction; these unit wires of steel have a diameter of 0.15 mm.

The cables 10 are arranged in the ply 6 with a distance apart (center to center) of 1.25 mm. They are inclined by an angle $\alpha$ of 26° in the S direction. The cables 10 are calendered between two layers of rubber of a thickness of 0.5 mm.

b. Unfolded ply 9

The cables 12 are composed of four steel wires of 0.23 mm assembled with a pitch of 10 mm in the S direction, and with a hoop 13 formed of a wire of 0.12 mm wound with a pitch of 3.2 mm in the Z direction.

The cables are arranged in the ply 9 with a distance apart of 0.85 mm. They are inclined by an angle $\beta$ of 20° in the Z direction. They are calendered between two layers of rubber of a thickness of 0.5 mm.

In the preferred embodiment of the invention, the angle $\alpha$ is greater than the angle $\beta$ and is greater than 15° and even 25°.

Figure 7:
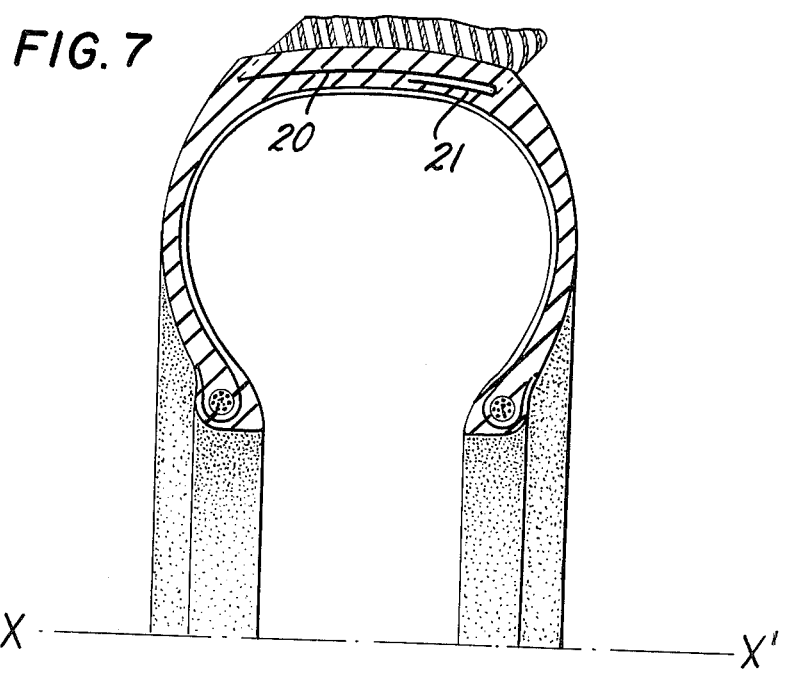

FIG. 6 shows a ply 10 having a portion 11 folded radially outward. In this case, the ply 10 and the cords or cables of which it is composed are both of S type. FIG. 7 shows on the other hand a ply 20 having a portion 21 folded radially inward. In this case, therefore, the ply 20 and the cords or cables of which it is composed are of opposite S/Z type, the former being type S and the latter being type Z. In each case, in accordance with the invention, the cords are relatively untwisted at the fold.

Thus there is provided in accordance with the invention a novel and highly effective tire capable of travel at high speeds with less damage than conventional tires. Many modifications of the representative embodiments disclosed herein will readily occur to those skilled in the art. Accordingly, the invention is to be construed as including all the embodiments thereof within the scope of the appended claims.

I claim:

1. A tire comprising a radial carcass and a tread reinforcement, the tread reinforcement comprising at least one ply of twisted metal cords having at least one folded portion, the direction of the fold of the ply, the direction of the inclination of the cords with respect to the circumferential direction of the tire, and the direction of the twist of the cords being such, relative to one another, that the cords are relatively untwisted at the fold.

2. A tire according to claim 1 wherein said ply and cords are both type S and the direction of the fold is radially outward.

3. A tire according to claim 1 wherein said ply and cords are both type Z and the direction of the fold is radially outward.

4. A tire according to claim 1 wherein said ply is type S, said cords are type Z, and the direction of the fold is radially inward.

5. A tire according to claim 1 wherein said ply is type Z, said cords are type S, and the direction of the fold is radially inward.

6. A tire according to claim 1 wherein the tread reinforcement further comprises at least one unfolded ply of metal cords, the cords of the folded ply making an angle with respect to the circumferential direction of the tire that is larger than the angle made by the cords of the unfolded ply with respect to the circumferential direction of the tire.

7. A tire according to claim 1 wherein the cords of the folded ply make an angle with respect to the circumferential direction of the tire within the range of 15° to 35°.

8. A tire according to claim 1 wherein the cords of the folded ply make an angle with respect to the circumferential direction of the tire within the range of 22½° to 35°.

* * * * *